US009479090B2

(12) United States Patent
Ogawa

(10) Patent No.: US 9,479,090 B2
(45) Date of Patent: Oct. 25, 2016

(54) MOTOR CONTROL CIRCUIT AND METHOD

(71) Applicant: Semiconductor Components Industries, LLC, Phoenix, AZ (US)

(72) Inventor: Takashi Ogawa, Gifu-ken (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 94 days.

(21) Appl. No.: 14/569,139

(22) Filed: Dec. 12, 2014

(65) Prior Publication Data
US 2015/0180391 A1    Jun. 25, 2015

Related U.S. Application Data

(60) Provisional application No. 61/918,693, filed on Dec. 20, 2013.

(51) Int. Cl.
| | |
|---|---|
| H02P 6/04 | (2016.01) |
| H02P 1/02 | (2006.01) |
| H02P 6/18 | (2016.01) |
| H02P 6/20 | (2016.01) |

(Continued)

(52) U.S. Cl.
CPC ............... H02P 1/02 (2013.01); H02P 6/085 (2013.01); H02P 6/17 (2016.02); H02P 6/182 (2013.01); H02P 6/20 (2013.01); H02P 27/085 (2013.01)

(58) Field of Classification Search
CPC .......... H02P 6/16; H02P 6/142; H02P 6/165; H02P 1/163; H02P 1/18; H02P 2201/09; H02P 6/20; H02P 6/14
USPC .................. 318/400.11, 400.13, 400.14, 721
See application file for complete search history.

(56) References Cited

U.S. PATENT DOCUMENTS

| | | | |
|---|---|---|---|
| 5,493,187 A | * | 2/1996 | Iijima .................. H02P 6/20 318/400.14 |
| 6,359,406 B1 | | 3/2002 | Chiu et al. |
| 6,483,270 B1 | | 11/2002 | Miyazaki et al. |

(Continued)

FOREIGN PATENT DOCUMENTS

| | | |
|---|---|---|
| JP | 2006-299810 A | 11/2006 |
| JP | 2008-43166 A | 2/2008 |

(Continued)

OTHER PUBLICATIONS

Application Note AN44140A by Panasonic, Sine-wave PWM drive system and rotor position detection method by 1-Hall-sensor, 1-Hall-Sensor Driver IC for 3-phase Brushless Motor; Doc No. TA4-EA-06180; Established Apr. 19, 2013; Revised Nov. 21, 2013.

(Continued)

*Primary Examiner* — Paul Ip
(74) *Attorney, Agent, or Firm* — Rannie William Dover

(57) ABSTRACT

In accordance with an embodiment, a drive circuit is provided for driving for a motor wherein the drive circuit includes a rotational state generation circuit connected to a state controller. The state controller is connected to a pulse width modulation detection circuit, a timer, and a duty control controller. In accordance with another embodiment, a method for driving the motor includes coupling a single Hall sensor to the motor and using the single Hall sensor to determine a position of a rotor of the motor. The drive circuit pulls the rotor so that one of its north pole or south pole is adjacent to the single Hall sensor. After the pole of the rotor is adjacent to the rotor, the motor starts.

20 Claims, 9 Drawing Sheets

(51) Int. Cl.
*H02P 27/08* (2006.01)
*H02P 6/08* (2016.01)

(56) References Cited

U.S. PATENT DOCUMENTS

| | | | | |
|---|---|---|---|---|
| 7,190,145 B2* | 3/2007 | Grand | ............ | H02P 6/165 318/400.13 |
| 7,271,564 B2* | 9/2007 | Ramu | ............ | H02K 1/24 318/254.1 |
| 7,397,237 B2* | 7/2008 | Hochhausen | ............ | H02P 6/16 324/173 |
| 7,423,394 B2* | 9/2008 | Collins | ............ | H02P 6/16 318/400.01 |
| 7,426,877 B2* | 9/2008 | Ehrlich | ............ | H02K 29/08 73/862.328 |
| 7,518,334 B2* | 4/2009 | Hochhausen | ............ | H02P 6/16 318/599 |
| 7,607,437 B2* | 10/2009 | Boyle | ............ | A61M 16/206 128/204.18 |
| 7,633,251 B2* | 12/2009 | Collins | ............ | H02P 6/16 318/400.14 |
| 8,677,995 B2* | 3/2014 | Boyle | ............ | A61M 16/206 128/200.24 |
| 8,729,839 B2 | 5/2014 | Suzuki et al. | | |
| 2002/0047683 A1* | 4/2002 | Kawashima | ............ | H02P 6/14 318/721 |
| 2003/0164692 A1* | 9/2003 | Grand | ............ | H02P 6/165 318/268 |
| 2005/0031322 A1* | 2/2005 | Boyle | ............ | A61M 16/206 388/800 |
| 2005/0146304 A1* | 7/2005 | Ramu | ............ | H02K 1/24 318/701 |
| 2007/0113682 A1* | 5/2007 | Ehrlich | ............ | H02K 29/08 73/862.328 |
| 2007/0159123 A1* | 7/2007 | Collins | ............ | H02P 6/16 318/400.1 |
| 2007/0194743 A1* | 8/2007 | Grand | ............ | H02P 6/165 318/721 |
| 2007/0222402 A1* | 9/2007 | Hochhausen | ............ | H02P 6/16 318/400.14 |
| 2007/0222434 A1* | 9/2007 | Hochhausen | ............ | H02P 6/16 324/207.25 |
| 2008/0092892 A1* | 4/2008 | Boyle | ............ | A61M 16/206 128/204.21 |
| 2008/0092893 A1* | 4/2008 | Boyle | ............ | A61M 16/206 128/204.21 |
| 2008/0297083 A1* | 12/2008 | Collins | ............ | H02P 6/16 318/400.13 |
| 2009/0284201 A1* | 11/2009 | Jeung | ............ | H02K 29/08 318/400.38 |
| 2013/0221880 A1 | 8/2013 | Sekihara | | |
| 2013/0293172 A1* | 11/2013 | Jeung | ............ | H02K 29/08 318/400.38 |

FOREIGN PATENT DOCUMENTS

| | | |
|---|---|---|
| JP | 4662729 B2 | 3/2011 |
| JP | 2012-105406 A | 5/2012 |
| JP | 2012-222950 A | 11/2012 |
| JP | 2013-31273 A | 2/2013 |
| JP | 2013-81320 A | 5/2013 |
| JP | 2013-183478 A | 9/2013 |

OTHER PUBLICATIONS

Application Note LV8804FV from ON Semiconductor, Bi-CMOS LSI PC and Server Fan Motor Driver Application Note, pp. 1-29, Dec. 2013, Semiconductor Components Industries, LLC, http://onsemi.com.

Datasheet No. BD63241FV from ROHM Semiconductor, DC Brushless Motor Drivers Three Phase 1 Hall Full-Sine Fan Motor Driver, pp. 1-15, 2013, TSZ22111-14-001, www.rohm.com.

Datasheet LV11961HA from ON Semiconductor, Bi-CMOS LSI for Brushless Motor Drive Sine Wave PWM Drive, Pre driver IC, pp. 1-14, Oct. 2014, Rev. 1, Publication Order No. LA11961HA/D, Semiconductor Components Industries, LLC, http://onsenni.com.

Datasheet LV8139JA from ON Semiconductor, Bi-CMOS LSI Single-phase Fan Motor Driver, pp. 1-18, May 2013, Ordering No. ENA2154, Semiconductor Components Industries, LLC, http://onsemi.com.

\* cited by examiner

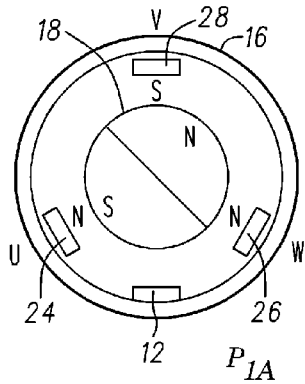 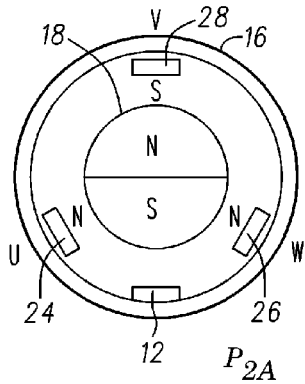 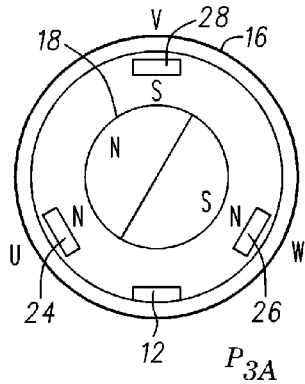
FIG. 5A  FIG. 5B  FIG. 5C
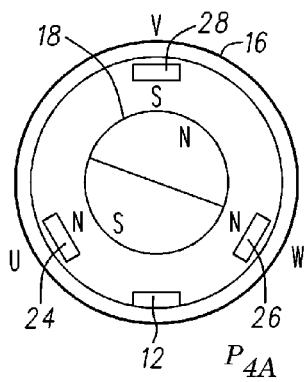 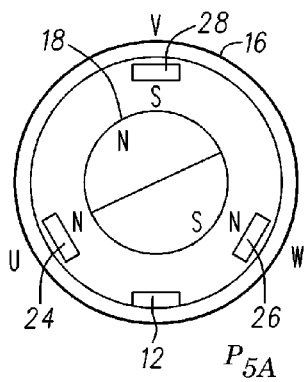 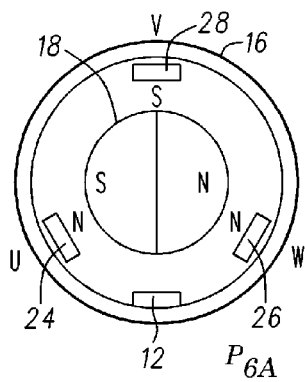
FIG. 5D  FIG. 5E  FIG. 5F
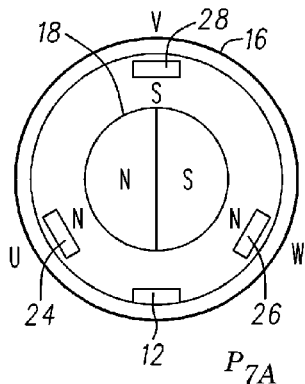
FIG. 5G

MOTOR CONTROL CIRCUIT AND METHOD

BACKGROUND

The present invention relates, in general, to motors and, more particularly, to three phase motors.

Multi-phase motors are used in a variety of applications including disc drives, digital video disc players, scanners, printers, plotters, actuators used in automotive and aviation industries, etc. Generally, multiple phase motors include a stationary portion or stator that produces a rotating magnetic field and a non-stationary portion or rotor in which torque is created by the rotating magnetic field. The torque causes the rotor to rotate which in turn causes a shaft connected to the rotor to rotate. The motors are driven by motor drive circuits.

Motor drive circuits are designed to meet desired motor performance parameters which may include noise level specifications, start-up specifications, maximum rotational speed specifications, etc. Noise specifications may be set to provide continuity of current flow during motor startup, or during motor rotation, or during motor stoppage. Start-up or motive power specifications may be set so that the motor reliably starts. Rotational speed specifications may be set to ensure there is sufficient torque drive to cover a large number of different motors. For example, the desired rotational speed of a server is higher than that of a personal computer. It is commonly believed that three-phase motors are better at achieving the desired specifications compared to single phase motors; however, three-phase motors cost more than single phase motors. In addition, three-phase motors provide current having sinusoidal characteristics from motor start-up to motor stoppage or cessation and they allow accurate determination of motor position and rotation speed. Three-phase motors typically include three Hall sensors, which is one of the reasons these motors are more expensive to manufacture. A Hall sensor may be referred to as a Hall element. U.S. Pat. No. 6,359,406 issued to Hsien-Lin Chiu et al. on Mar. 19, 2002, discloses three-phase motors and in particular discloses a three-phase motor having two Hall sensors or two Hall elements. A drawback with this technology is that it uses special bias circuitry that complicates its design and increases costs. A technique to lower the cost of three-phase motors is to manufacture the motor drive circuitry as a sensorless motor drive circuit, i.e., a motor without sensors. U.S. Pat. No. 6,483,279 issued to Shinichi Miyazaki et al. on Nov. 19, 2002, discloses a three-phase motor without sensors. A drawback with sensor-less motor drive configurations is that they may fail to start if the inductive voltage of the coil is small.

Accordingly, it would be advantageous to have a multi-phase motor drive circuit and a method for driving the motor that is not overly complex and that can handle small inductive coil voltages. It is desirable for the multi-phase drive circuit and method to be cost and time efficient to implement.

BRIEF DESCRIPTION OF THE DRAWINGS

The present invention will be better understood from a reading of the following detailed description, taken in conjunction with the accompanying drawing figures, in which like reference characters designate like elements and in which:

FIG. 5A is a diagrammatic representation of the motor of FIG. 1 stopped in a first position;

FIG. 5B is a diagrammatic representation of the motor of FIG. 1 stopped in another position;

FIG. 5C is a diagrammatic representation of the motor of FIG. 1 stopped in another position;

FIG. 5D is a diagrammatic representation of the motor of FIG. 1 stopped in another position;

FIG. 5E is a diagrammatic representation of the motor of FIG. 1 stopped in another position;

FIG. 5F is a diagrammatic representation of the motor of FIG. 1 stopped in another position;

FIG. 5G is a diagrammatic representation of the motor of FIG. 1 stopped in another position;

Figure 1:
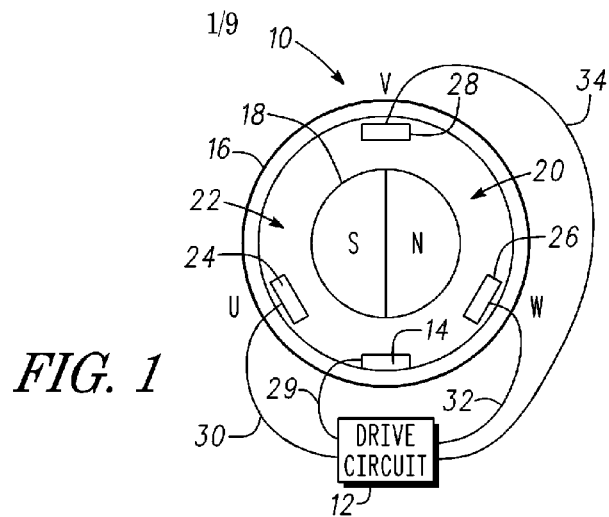
FIG. 1 is a diagrammatic representation of a motor that is driven by a drive circuit in accordance with an embodiment of the present invention.
Figure 3:
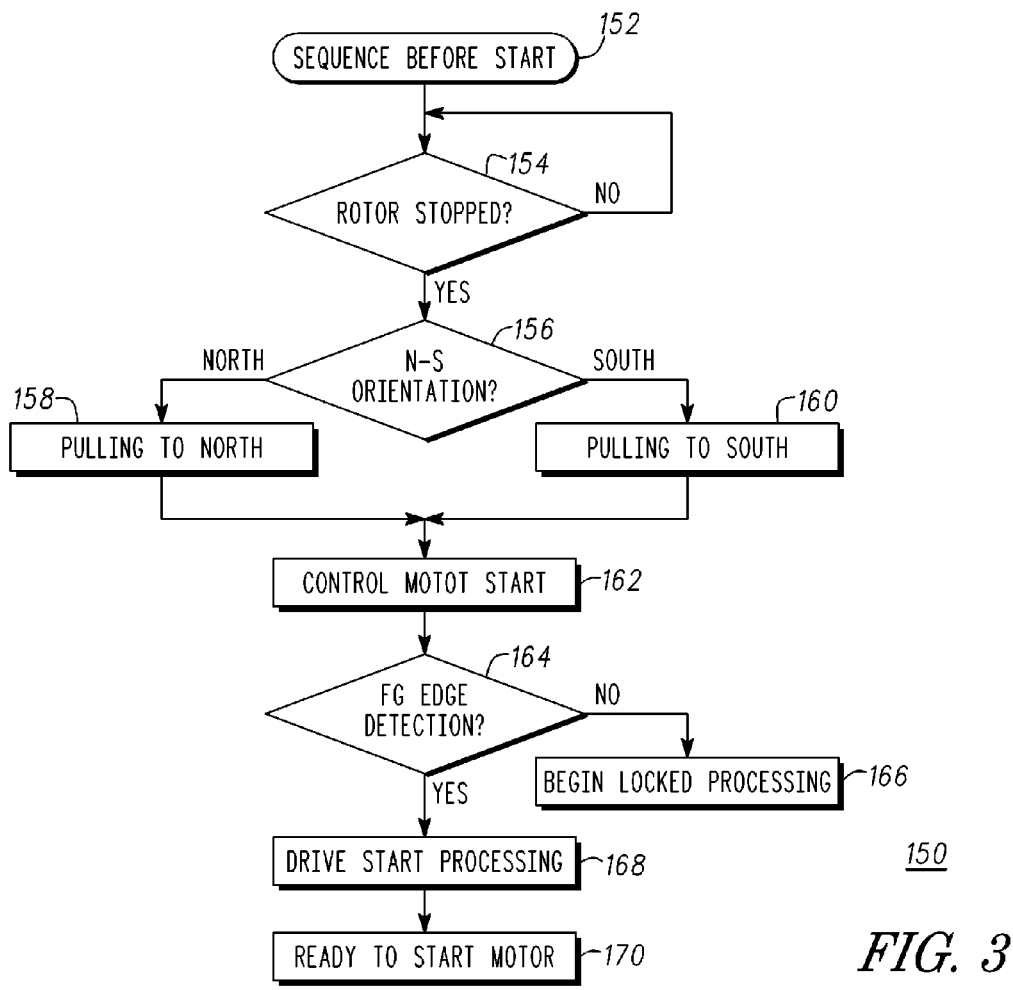
FIG. 3 is a flow diagram of starting a motor in accordance with another embodiment of the present invention.

For simplicity and clarity of illustration, elements in the figures are not necessarily to scale, and the same reference characters in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or an anode of a diode, and a control electrode means an element of the device that controls current flow through the device such as a gate of an MOS transistor or a base of a bipolar transistor. Although the devices are explained herein as certain n-channel or p-channel devices, or certain n-type or p-type doped regions, a person of ordinary skill in the art will appreciate that complementary devices are also possible in accordance with embodiments of the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action and the initial action. The use of the words approximately, about, or substantially means that a value of an element has a parameter that is expected to be very close to a stated value or position. However, as is well known in the art there are always minor variances that prevent the values or positions from being exactly as stated. It is well established in the art that variances of up to about ten percent (10%) (and up to twenty percent (20%) for semiconductor doping concentrations) are regarded as reasonable variances from the ideal goal of exactly as described.

It should be noted that a logic zero voltage level ($V_L$) is also referred to as a logic low voltage or logic low voltage level and that the voltage level of a logic zero voltage is a function of the power supply voltage and the type of logic family. For example, in a Complementary Metal Oxide Semiconductor (CMOS) logic family a logic zero voltage may be thirty percent of the power supply voltage level. In a five volt Transistor-Transistor Logic (TTL) system a logic zero voltage level may be about 0.8 volts, whereas for a five volt CMOS system, the logic zero voltage level may be about 1.5 volts. A logic one voltage level ($V_H$) is also referred to as a logic high voltage level, a logic high voltage, or a logic one voltage and, like the logic zero voltage level, the logic high voltage level also may be a function of the power supply and the type of logic family. For example, in a CMOS system a logic one voltage may be about seventy percent of the power supply voltage level. In a five volt TTL system a logic one voltage may be about 2.4 volts, whereas for a five volt CMOS system, the logic one voltage may be about 3.5 volts.

DETAILED DESCRIPTION

FIG. 1 is a diagrammatic representation of a three-phase motor 10 that is driven by a drive circuit 12 in response to one or more signals from a Hall sensor 14 in accordance with an embodiment of the present invention. Drive circuit 12 may be referred to as a driver and Hall sensor 14 may be referred to as a Hall element. Three-phase motor 10 includes a stator 16 and a rotor 18 having a portion 20 magnetized with a first pole and a portion 22 magnetized with a second pole. By way of example, portion 20 is a north pole and portion 22 is a south pole. A coil 24 is coupled to or mounted on a portion of stator 16, a coil 26 is coupled to or mounted on another portion of stator 16, and a coil 28 is coupled to or mounted on yet another portion of stator 16. Drive circuit 12 is coupled to Hall sensor 14 via an electrical interconnect 29, to coil 24 via an electrical interconnect 30, to coil 26 via an electrical interconnect 32, and to coil 28 through an electrical interconnect 32. Coil 24 may be referred to as a U-phase winding, coil 26 may be referred to as a W-phase winding, and coil 28 may be referred to as a V-phase winding. Electrical interconnects 30, 32, and 34 may be wires, electrically conductive traces, or the like.

Figure 2:
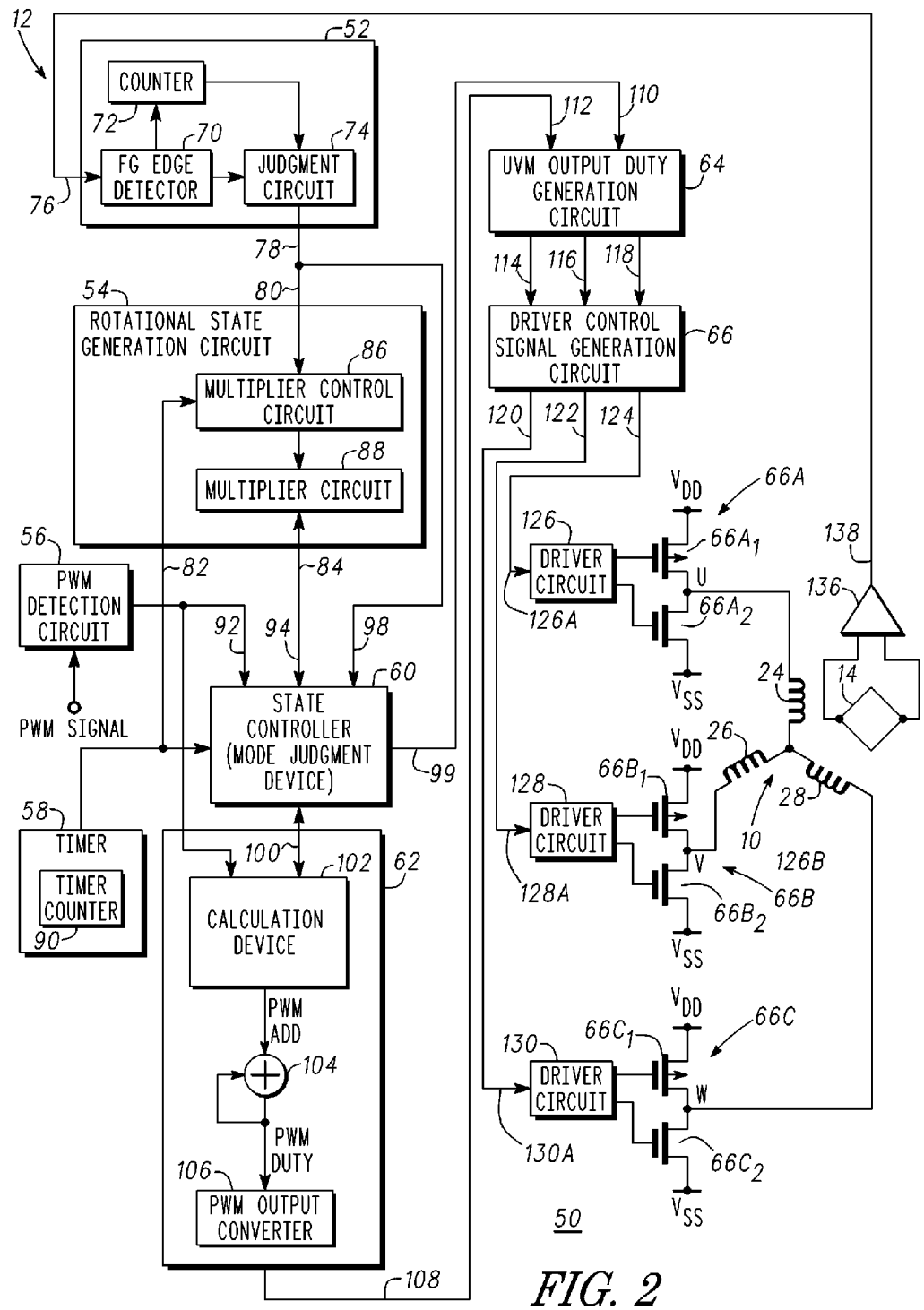
FIG. 2 is a block diagram further illustrating the drive circuit of FIG. 1.

FIG. 2 is a block diagram 50 further illustrating drive circuit 12. It should be noted that block diagram 50 includes diagrammatic representations of drive circuit 12, three-phase motor 10, and Hall sensor 14. Drive circuit 12 includes an FG signal masking circuit 52, a rotational state generation circuit 54, a pulse width modulation ("PWM") detection circuit 56, a timer 58, a status controller 60, a duty control controller 62, an output duty generation circuit 64, a drive control signal generation circuit 66, and an output drive stage 68. More particularly, FG signal masking circuit 52 may be comprised of an FG signal edge detector 70, a counter 72, and an FG signal judgment circuit 74. FG signal edge detector 70 has an input that serves as an input 76 of drive circuit 12, an output connected to an input of counter 72 and an output connected to an input of FG signal judgment circuit 74. An output 78 of FG signal judgment circuit 74 serves as an output of FG signal masking circuit 52. FG signal masking circuit 52 may be referred to as a chattering mitigation circuit or a chattering mitigation feature.

Rotational state generation circuit 54 has inputs 80 and 82, an input/output 84, and may be referred to as an FG generation circuit. Output 78 of FG signal masking circuit 52 is connected to input 80 of FG generation circuit 54. Input/output 84 may be referred to as an input/output node, an I/O node, an input/output terminal, an I/O terminal, or the like. Rotational state generation circuit 54 may be comprised of a control circuit 86 coupled to a multiplier circuit 88. It should be noted that input 80 and input 84 are connected to multiplier control circuit 86 and input/output 84 is connected to multiplier circuit 88. PWM detection circuit 56 has an output connected to an input of state controller 60 and to an input of duty control controller 62 and is configured to determine the speed of rotor 18. It should be noted that if the duty range is small the speed of the rotor is smaller than if the duty range is large. Timer 58 has an output connected to input 82 of rotational state generation circuit 54 and to an input 92 of state controller 60 and may include a timer counter 90. In addition, state controller 60 has an input/output 94 connected to an input/output 84 of rotational state generation circuit 54, an input 98 connected to output 78 of FG signal masking circuit 52, and an input/output 96 connected to an input/output 100 of duty control controller 62. By way of example, duty control controller 62 is comprised of a calculation device 102 configured to determine an amount of change to the duty cycle, a summer 104, and a PWM converter 106. Calculation device 102 has an input that serves as input/output 100 and an output connected to an input of summer 104. In addition, summer 104 has an output that is connected to an input of PWM output converter 106 and to another input of summer 104. An output 108 of PWM output converter 106 serves as an output of duty control controller 62. State controller 60 is configured for determining the status or condition of the FG signal and the PWM signal and duty control controller 62 is configured to control an output sine wave, which helps to make the motor quieter.

Output duty generation circuit 64 has an input 110 connected to an output 99 of output of state controller 60, an input 112 connected to output 108 of output duty generation circuit 62, and a plurality of outputs 114, 116, and 118 connected to corresponding inputs of drive control signal generation circuit 66, which signal generation circuit 66 has a plurality of outputs 120, 122, and 124 connected to corresponding inputs of output drive stage 68. In accordance with an embodiment, drive stage 68 includes driver devices 126, 128, and 130 having inputs that serve as inputs 126A, 128A, and 130A of output drive stage 68, a pair 66A of transistors having a terminal connected to U-phase winding 24, a pair 66B of transistors having a terminal connected to W-phase winding 26, and a pair 66C of transistors having a terminal connected to V-phase winding 28. Pair of transistors 66A is comprised of transistors $66A_1$ and $66A_2$, wherein each transistor has a control electrode, and a pair of current carrying electrodes. The control electrodes of transistors $66A_1$ and $66A_2$ are coupled for receiving control signals from driver device 126, one current carrying electrode of transistor $66A_1$ is coupled for receiving a source of potential $V_{DD}$ and the other current carrying electrode of transistor $66A_1$ is connected to a current carrying electrode of transistor $66A_2$. The other current carrying terminal of transistor $66A_2$ is coupled for receiving a source of potential $V_{SS}$ such as, for example, a ground potential. The commonly connected current carrying electrodes of transistors $66A_1$ and $66A_2$ are connected to U-phase winding 24.

Pair of transistors 66B is comprised of transistors $66B_1$ and $66B_2$, wherein each transistor has a control electrode, and a pair of current carrying electrodes. The control electrodes of transistors $66B_1$ and $66B_2$ are coupled for receiving control signals from driver device 128, one current carrying electrode of transistor $66B_1$ is coupled for receiving a source of potential $V_{DD}$ and the other current carrying electrode of transistor $66B_1$ is connected to a current carrying electrode of transistor $66B_2$. The other current carrying terminal of transistor $66B_2$ is coupled for receiving a source of operating potential $V_{SS}$ such as, for example, a ground potential. The commonly connected current carrying electrodes of transistors $66B_1$ and $66B_2$ are connected to U-phase winding 26.

Pair of transistors 66C is comprised of transistors $66C_1$ and $66C_2$, wherein each transistor has a control electrode, and a pair of current carrying electrodes. The control electrodes of transistors $66C_1$ and $66C_2$ are coupled for receiving control signals from driver device 130, one current carrying electrode of transistor $66C_1$ is coupled for receiving a source of potential $V_{DD}$ and the other current carrying electrode of transistor $66C_1$ is connected to a current carrying electrode of transistor $66C_2$. The other current carrying terminal of transistor $66C_2$ is coupled for receiving a source of operating potential $V_{SS}$ such as, for example, a ground potential. The commonly connected current carrying electrodes of transistors $66C_1$ and $66C_2$ are connected to U-phase winding 28.

A comparator 136 has inputs connected to corresponding inputs of a Hall sensor 14 and an output 138 connected to input 76 of rotational state generation circuit 54.

It should be noted that in accordance with an alternative embodiment, FG signal masking circuit 52 is absent from drive circuit 12 and that output 138 of comparator 136 is commonly connected to input 76 of rotational state generation circuit 54 and to input 98 of state controller 60.

Starting a three-phase motor such as, for example, three-phase motor 10 using a Hall sensor 14 in accordance with an embodiment of the present invention is described with reference to flow diagram 150 shown in FIG. 3, FIGS. 4A-4G, FIGS. 5A-5G, and flow diagram 180 shown in FIG. 9. Referring now to flow diagram 150, at a time indicated by box 152, the process for staring three-phase motor 10 begins, wherein drive circuit 12 may be stopped, beginning to stop, or nominally rotating. At decision diamond 154, drive circuit 12 confirms whether rotor 18 has stopped rotating. If rotor 18 is rotating or moving, i.e., rotor 18 has not stopped, drive circuit 12 and continues monitoring the rotational status of rotor 18 as indicated by the No or N of decision diamond 154. If rotor 18 has stopped rotating, drive circuit 12 determines the north-south magnetic orientation of Hall sensor 14 as indicated by decision diamond 156, and, in accordance with embodiments of the present invention, moves rotor 18 in a clockwise direction or a counterclockwise direction so that the north pole of rotor 18 or the south pole of rotor 18 are adjacent to or aligned with Hall sensor 14 as indicated by boxes 158 and 160.

Figure 4A:
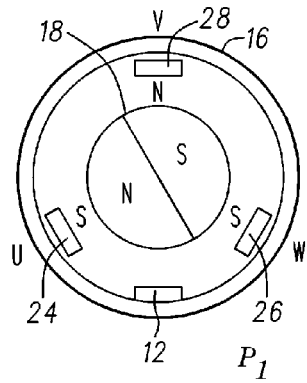
FIG. 4A is a diagrammatic representation of the motor of FIG. 1 stopped in a first position.
Figure 4B:
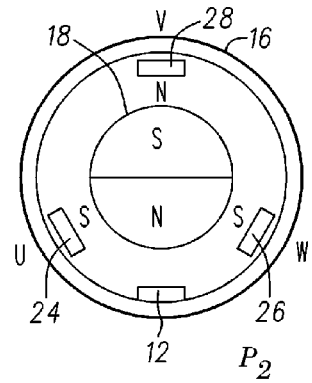
FIG. 4B is a diagrammatic representation of the motor of FIG. 1 stopped in another position.
Figure 4C:
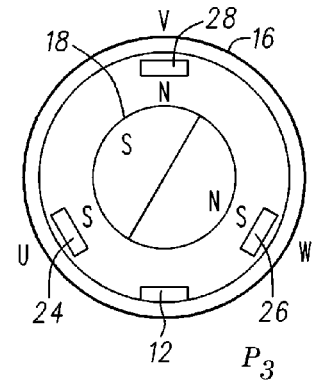
FIG. 4C is a diagrammatic representation of the motor of FIG. 1 stopped in another position.
Figure 4D:
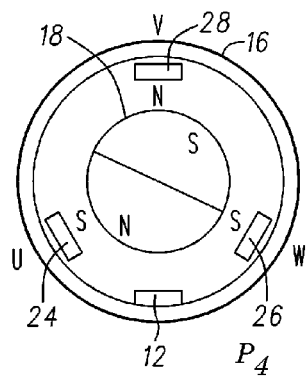
FIG. 4D is a diagrammatic representation of the motor of FIG. 1 stopped in a first position.
Figure 4E:
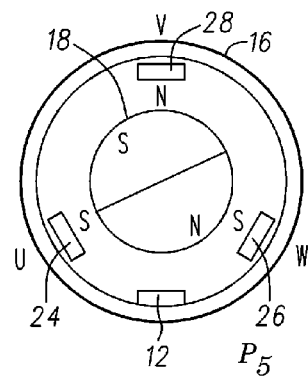
FIG. 4E is a diagrammatic representation of the motor of FIG. 1 stopped in another position.
Figure 4F:
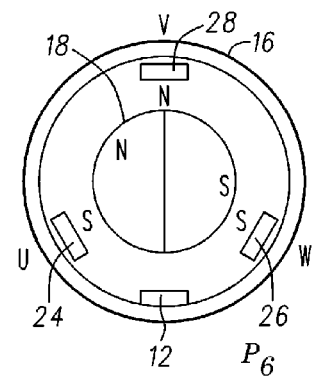
FIG. 4F is a diagrammatic representation of the motor of FIG. 1 stopped in another position.
Figure 4G:
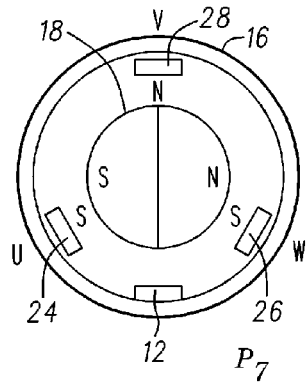
FIG. 4G is a diagrammatic representation of the motor of FIG. 1 stopped in another position.

The north pole ("N") and the south pole ("S") of rotor 18 may stop in a plurality positions relative to Hall sensor 14. For example, FIGS. 4A-4G are diagrammatic representations of three-phase motor 10 that includes U-phase winding 24, W-phase winding 26, and V-phase winding 28 described with reference to FIG. 1 showing rotor 18 stopped at different locations or positions. It should be noted that in FIGS. 4A-4G, U-phase winding 24 and W-phase winding 26 are magnetized with a south polarity and V-phase winding 28 is magnetized with a north polarity. In FIG. 4A the north pole of rotor 18 has stopped near or adjacent to U-phase winding 24 and the south pole of rotor 18 has stopped between V-phase winding 28 and W-phase winding 26 so that rotor 18 is in a position $P_1$. In FIG. 4B, the north pole of rotor 18 has stopped near or adjacent to Hall sensor 14 and the south pole of rotor 18 has stopped near or adjacent to V-phase winding 28 so that rotor 18 is in a position $P_2$. In FIG. 4C the north pole of rotor 18 has stopped near or adjacent to W-phase winding 26 and the south pole of rotor 18 has stopped between V-phase winding 28 and U-phase winding 24 so that rotor 18 is in a position $P_3$. In FIG. 4D the north pole of rotor 18 has stopped between U-phase winding 24 and Hall sensor 24 and the south pole of rotor 18 has stopped between V-phase winding 28 and W-phase winding 26 so that rotor 18 is in a position $P_4$. In FIG. 4E the north pole of rotor 18 has stopped between Hall sensor 24 and W-phase winding 26 and the south pole of rotor 18 has stopped between V-phase winding 28 and U-phase winding 24 so that rotor 18 is in a position $P_5$. In FIG. 4F the north pole of rotor 18 has stopped between U-phase winding 24 and V-phase winding 28 and the south pole of rotor 18 has stopped between V-phase winding 28 and W-phase winding 26 so that rotor 18 is in a position $P_6$. In FIG. 4G the north pole of rotor 18 has stopped between V-phase winding 28 and W-phase winding 26 and the south pole of rotor 18 has stopped between V-phase winding 28 and U-phase winding 24 so that rotor 18 is in a position $P_7$. In FIG. 4H the north pole of rotor 18 has stopped near or adjacent to V-phase winding 28 and the south pole of rotor 18 has stopped near or adjacent to Hall sensor 24 so that rotor 18 is in a position $P_8$.

In FIGS. 5A-5G, U-phase winding 24 and W-phase winding 26 are magnetized with a north polarity and V-phase winding 28 is magnetized with a south polarity. In FIG. 5A, the south pole of rotor 18 has stopped near U-phase winding 24 and the north pole of rotor 18 has stopped between V-phase winding 28 and W-phase winding 26 so that rotor 18 is in a position $P_{1A}$. In FIG. 5B, the south pole of rotor 16 has stopped near or adjacent to Hall sensor 14 and the north pole of rotor 18 has stopped near or adjacent to V-phase winding 28 so that rotor 18 is in a position $P_{2A}$. In FIG. 5C the south pole of rotor 18 has stopped near or adjacent to W-phase winding 26 and the north pole of rotor 18 is between V-phase winding 28 and U-phase winding 24 so that rotor 18 is in a position $P_{3A}$. In FIG. 5D the south pole of rotor 18 has stopped between U-phase winding 24 and Hall sensor 24 and the north pole of rotor 18 has stopped between V-phase winding 28 and W-phase winding 26 so that rotor 18 is in a position $P_{4A}$. In FIG. 5E the south pole of rotor 18 has stopped between Hall sensor 24 and W-phase winding 26 and the north pole of rotor 18 has stopped between V-phase winding 28 and U-phase winding 24 so that rotor 18 is in a position $P_{5A}$. In FIG. 5F the south pole of rotor 18 has stopped between U-phase winding 24 and V-phase winding 28 and the north pole of rotor 18 has stopped between V-phase winding 28 and W-phase winding 26 so that rotor 18 is in a position $P_{6A}$. In FIG. 5G the south pole of rotor 18 has stopped between V-phase winding 28 and W-phase winding 26 and the north pole of rotor 18 has stopped between V-phase winding 28 and U-phase winding 24 so that rotor 18 is in a position $P_{7A}$. In FIG. 5H the south pole of rotor 18 has stopped near or adjacent to V-phase winding 28 and the north pole of rotor 18 has stopped near or adjacent to Hall sensor 24 so that rotor 18 is in a position $P_{8A}$.

In operation and in response to rotor 18 stopping such that its north pole stator is not adjacent to Hall sensor 14 as shown in FIGS. 4A and 4C-4G, drive circuit 12 generates control signals to rotate rotor 18 in a clockwise direction or a counter clockwise direction so that the north pole of rotor 18 is adjacent Hall sensor 14 as shown in FIG. 4B. Alternatively, in response to rotor 18 stopping such that its south pole is not adjacent to Hall sensor 14 as shown in FIGS. 5A and 5C-5G, drive circuit 12 generates control signals to rotate the rotor 18 in a clockwise direction or a counter-clockwise direction so that the south pole of the rotor 18 is adjacent Hall sensor 14 as shown in FIG. 5B. Rotor 18 is moved in accordance with the magnetic force sensed by Hall sensor 14. By way of example, rotor 18 may be positioned in response to Hall sensor 14 sensing a maximum magnetic force from the north pole or a maximum magnetic force from the south pole. Alternatively, rotor 18 may be positioned in response to Hall sensor 14 sensing a magnetic force from the north pole being greater than a north reference force ($MF_N$) or the rotor may be positioned in response to Hall sensor 14 sensing a magnetic force from the south pole being greater than a south reference force ($MF_S$), where north reference force $MF_N$ may be equal to south reference force $MF_S$. Motor 10 may be started in response to rotor 18 being positioned in the primary position or the secondary position. Thus, drive circuit 12 performs north side retreat processing to move the north pole of rotor 18 to be adjacent to Hall sensor 14 as indicated by box 158 or drive circuit 12 performs south side retreat processing to move the south pole of rotor 18 to be adjacent to Hall sensor 14 as indicated by box 160.

Figure 6:
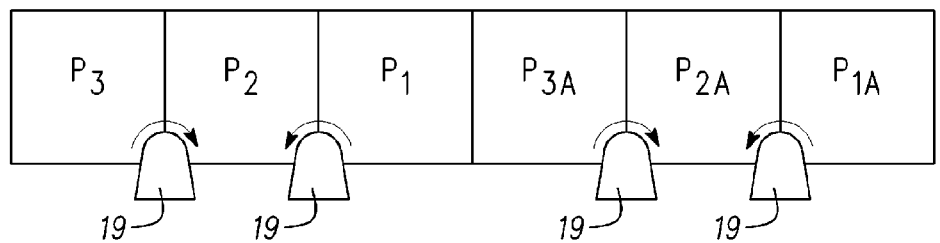
FIG. 6 is a flow diagram of starting a motor in accordance with another embodiment of the present invention.

FIG. 6 is a diagrammatic representation illustrating that when rotor 18 is positioned at position $P_1$ or position $P_3$ as shown in FIGS. 4A and 4C, respectively, a barrier 19 must be overcome for rotor 18 to arrive at position $P_2$, i.e., a predetermined or desired position that helps to reliably start motor 10 by applying a positive torque to rotor 18, shown in FIG. 4B. In addition, FIG. 6 illustrates that when rotor 18 is positioned at position $P_{1A}$ or position $P_{3A}$ as shown in FIGS. 5A and 5C, respectively, barrier 19 must be overcome for rotor 18 to arrive at position $P_{2A}$, i.e., a predetermined or desired position, shown in FIG. 5B. Barrier 19 represents issues such as ringing, the time needed to stop at a fixed position when the rotor has stopped at a distance away from the desired starting position, etc.

Figure 7:
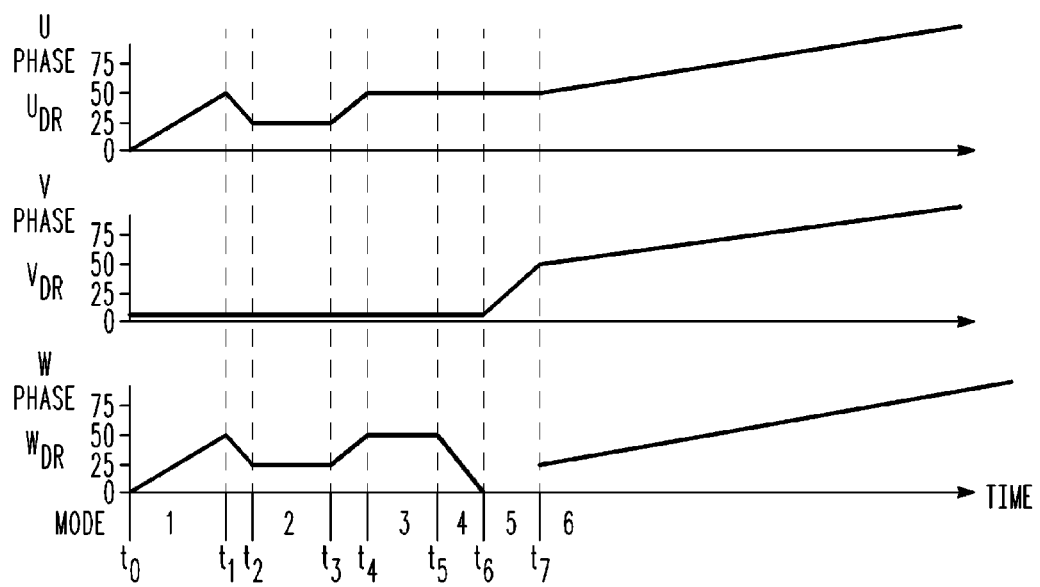
FIG. 7 illustrates the application of the control torque in moving a rotor in accordance with a duty adjustment embodiment.

FIG. 7 illustrates the application of the control torque in moving rotor 18 from the position shown in, for example, FIG. 5A to the position shown in FIG. 5B, i.e., the primary configuration in accordance with a duty adjustment embodiment. From time $t_0$ to time $t_1$, drive circuit 12 applies a drive signal $U_{DR}$ to U-phase winding 24 having a duty cycle that exceeds the duty cycle of the cogging torque and a drive signal $W_{DR}$ to W-phase winding 26 having a duty cycle that exceeds the duty cycle of the cogging torque. By way of example, the duty cycles of drive signals $U_{DR}$ and $W_{DR}$ are gradually increased from 0 to 50 percent (%). At time $t_1$, the duty cycles of drive signals $U_{DR}$ and $W_{DR}$ are at 50%, which exceeds the duty cycle of the cogging torque. The time from about $t_0$ to about $t_1$ may be referred to as mode 1. In response to reaching the duty cycle that exceeds that of the cogging torque at time $t_1$, drive circuit 12 generates drive signals that reduce the duty cycles of drive signals $U_{DR}$ and $W_{DR}$ to reduce the ringing of the rotor, i.e., to reduce the oscillations of the rotor about a rotor stopping location. By way of example, drive circuit 12 reduces the duty cycles of drive signals $U_{DR}$ and $W_{DR}$ to 25%. The time from about $t_1$ to about $t_3$ may be referred to as mode 2. At time $t_3$, drive circuit 12 increases the duty cycles of drive signals $U_{DR}$ and $W_{DR}$ until rotor 18 begins to move or rotate, wherein rotor 18 begins to rotate in response to the drive signals $U_{DR}$ and $W_{DR}$ having a duty cycle of 50%, thus drive circuit 12 increases the duty cycles of drive signals $U_{DR}$ and $W_{DR}$ to 50% at time $t_4$. In response to rotor 18 reaching the desired position, e.g., rotor 18 being in the first configuration or the second configuration, at time $t_5$, drive circuit 12 generates a drive signal $U_{DR}$ having a duty cycle of 50% and a drive signal $W_{DR}$ having a duty cycle that decreases, which causes rotor 18 to stop rotating at the desired position. The time from about $t_3$ to about $t_5$ may be referred to as mode 3. At time $t_6$, drive circuit 12 generates a drive signal $V_{DR}$ that increases from, for example 0 to 50% and generates drive signals $U_{DR}$ and $W_{DR}$ having duty cycles of 50% and 0, respectively. The time from about $t_5$ to about $t_6$ may be referred to as mode 4. The time from about $t_6$ to about $t_7$ may be referred to as mode 5. At time $t_7$, rotor 18 has begun to rotate motor 10 enters a seventh operating mode, i.e., mode 7, at about time $T_7$ and drive signals $U_{DR}$, $W_{DR}$, and $V_{DR}$ become sine waves having different phases from each other. Thus, the duty of the drive signal, i.e., the UVW drive signals, is gradually increased until a predetermined duty is achieved and the duty is lowered.

Figure 8:
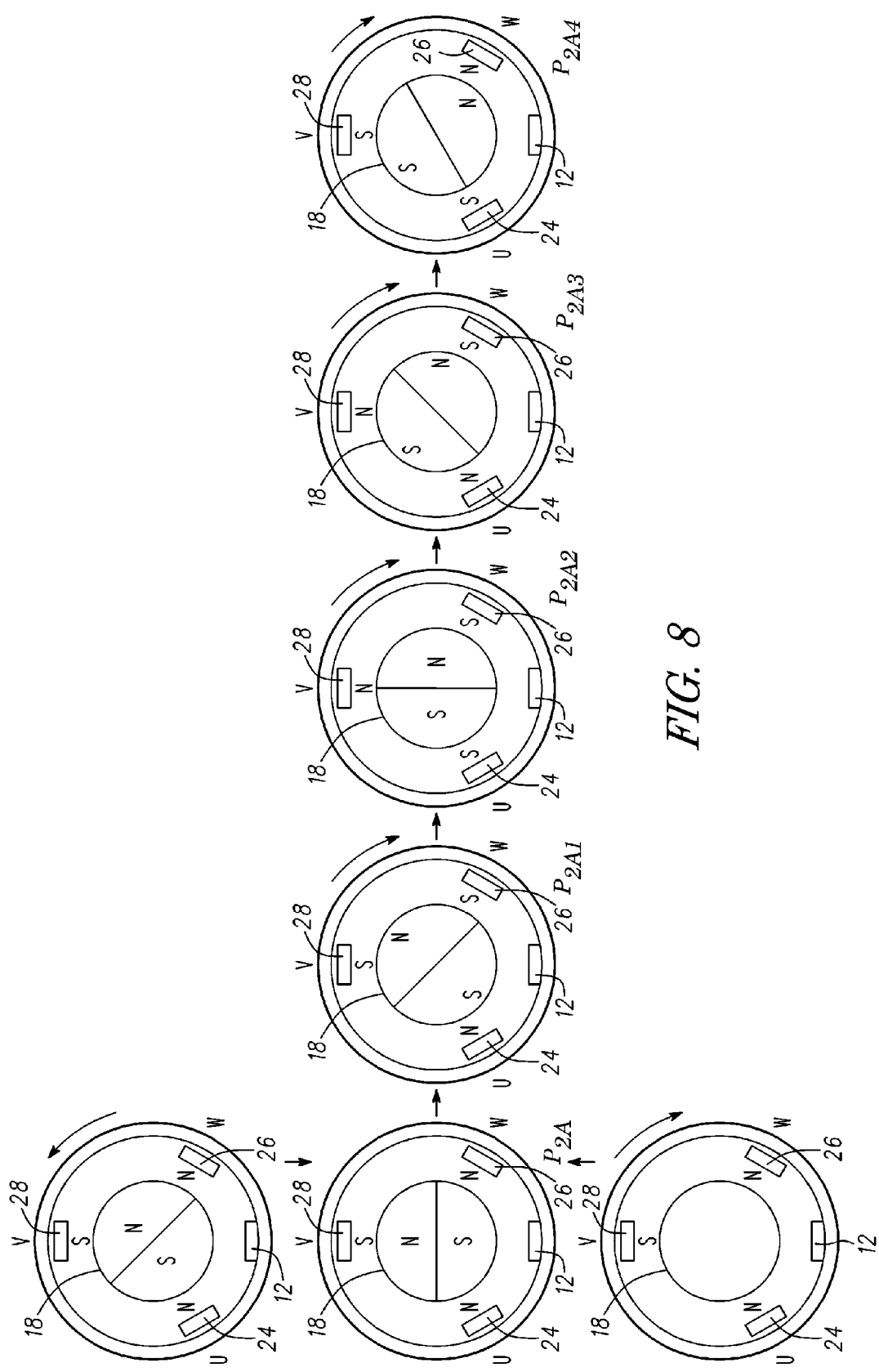
FIG. 8 is a diagrammatic representation of starting the motor of FIG. 1 in accordance with an embodiment of the present invention.

FIG. 8 illustrates moving rotor 18 in accordance with an embodiment of the present invention. FIG. 8 illustrates rotating or moving rotor 18 so that it is positioned in the secondary configuration in preparation for starting motor 10. Rotor 18 may be in position $P_{1A}$ or $P_{3A}$ as shown in FIG. 5A and FIG. 5C, respectively, and shown in FIG. 8. As discussed with reference to FIG. 5, motor 10 moves rotor 18 to be in position $P_{1B}$ as shown in FIG. 5B. FIG. 8 illustrates that drive circuit 12 generates drive signals that change the polarity of the magnetic field at W-phase winding 26 from north to south, causing rotor 18 to rotate in a clockwise direction to position $P_{2A1}$. In response to moving to position $P_{2A1}$, drive circuit 12 generates drive signals that change the polarity of the magnetic field at V-phase winding 28 from south to north so that rotor 18 continues rotating in the clockwise direction to position $P_{2A2}$. In response to moving to position $P_{2A2}$, drive circuit 12 generates drive signals that change the polarity of the magnetic field at U-phase winding 24 from north to south so that rotor 18 continues rotating in the clockwise direction to position $P_{2A3}$. In response to moving to position $P_{2A3}$, drive circuit 12 generates drive signals that change the polarity of the magnetic field at W-phase winding 26 from south to north so that rotor 18 continues rotating in the clockwise direction to position $P_{2A4}$. The rotation of rotor 18 continues until the desired stop position or location is achieved.

Referring again to FIG. 3, at box 162, drive circuit 12 generates a control signal to start three-phase motor 10. In response to starting three-phase motor 10 an FG signal is generated and drive circuit 12 detects an edge of the FG signal, i.e., a rising edge or a falling edge of the FG signal. If an edge of an FG signal has not been detected, drive circuit 12 initiates control procedures for the motor being in a locked condition or a stuck condition as indicated by decision diamond 164 and box 166. Thus, in response to not detecting a rising edge or a falling edge of an FG signal at decision diamond 164, control circuit 12 implements or begins a locked processing procedure.

If an edge of the FG signal has been detected, control circuit 12 begins a motor start procedure as indicated by decision diamond 164 and box 168. Thus, in response to detecting a rising edge or a falling edge of the FG signal at decision diamond 164, control circuit 12 implements or begins a drive start processing procedure that includes generating a sine wave drive signal. Accordingly, three-phase motor 10 is ready to start as indicated by box 170.

Figure 9:
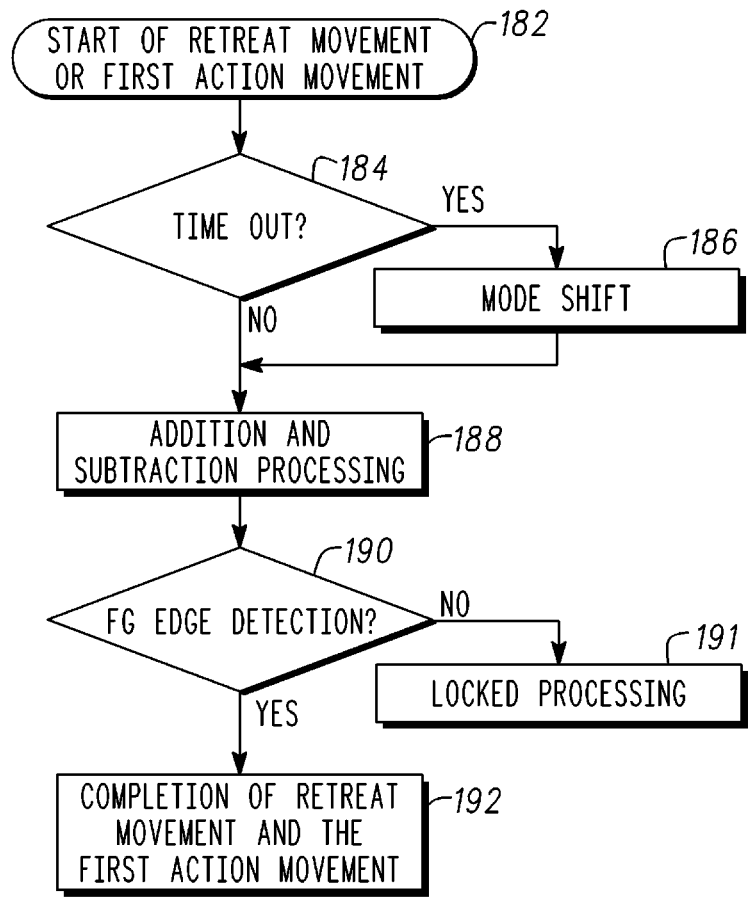
FIG. 9 is a flow diagram for calculating the duty levels in accordance with another embodiment of the present invention.

FIG. 9 is a flowchart 180 of a process from the beginning of moving rotor 18 to an initial position to the completion of the initial process. Each mode is controlled by a timer. Motor 10 shifts to another mode in response to reaching a predetermined time. At box 182, the retreat movement or the start of the first action movement commences. At decision diamond 184, drive circuit 12 determines whether a predetermined time has elapsed in response to drive circuit 12 entering an operating mode. If the time has elapsed, indicated by a Yes at decision diamond 184, drive circuit 12 shifts to the next mode indicated by box 186 and then continues with addition or subtraction processing to generate a signal for moving rotor 18 indicated by box 188. If the time has not elapsed, indicated by a No at decision diamond 184, drive circuit 12 continues with addition or subtraction processing to generate a signal for moving rotor 18, without shifting modes indicated by box 188. After processing in box 188, the presence of an edge is detected as indicated by decision diamond 190. If an FG edge signal is detected, identified by the No branch of decision diamond 190, locked processing begins as indicated by box 191. If an FG edge signal is detected, indicated by the Yes branch of decision diamond 190, movement of rotor 18 to an initial position and initial process are completed in response to detecting the FG signal during mode 4 or mode 6 (indicated by box 192), and it transitions to sine-wave-drive signal, i.e., a drive signal having a sinusoidal configuration.

Figure 10:
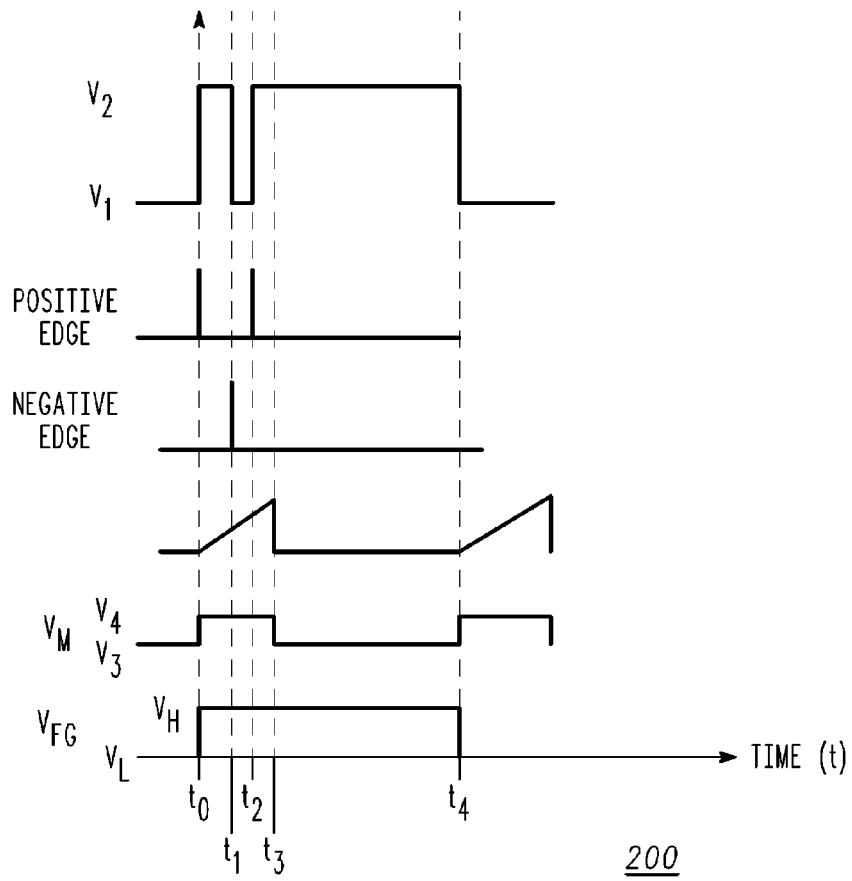
FIG. 10 is a startup procedure in accordance with another embodiment of the present invention.

In accordance with another embodiment, at an early stage of the initiation control procedure a masking phase is started as illustrated by timing diagram 200 shown in FIG. 10. At time $t_0$, the FG signal, $V_{FG}$, transitions from level $V_L$ to level $V_H$ in response to detecting an edge of an initial rise of the FG signal and the output signal of comparator 136 transitions from voltage level $V_1$ to voltage level $V_2$. An edge detector indicates that a rising edge of the FG signal occurs at about time $t_0$. In addition, a mask signal $V_M$ transitions from voltage level $V_3$ to voltage level $V_4$ and the output of counter 90 increases in response to counter 90 beginning to count.

At time $t_1$, the output signal of comparator 136 transitions from voltage level $V_2$ to voltage level $V_1$ and an edge detector indicates that a falling edge of the FG signal occurs at about time $t_1$. It should be noted that mask signal $V_M$ remains at voltage level $V_4$ at time $t_1$ because counter 90 has not reached a predetermined count value.

At time $t_2$, the output signal of comparator 136 transitions from voltage level $V_1$ to voltage level $V_2$ and the edge detector indicates that a rising edge of the FG signal occurs at about time $t_2$. It should be noted that mask signal $V_M$ remains at voltage level $V_4$ at time $t_2$ because counter 90 has not reached a predetermined count value.

At time $t_3$, counter 90 reaches a predetermined count value and mask signal VM transitions from voltage level $V_4$ to voltage level $V_3$, thereby unmasking the FG signal $V_{FG}$ so that control circuit can respond to FG signal $V_{FG}$.

At time $t_4$, the output signal of comparator 136 transitions from voltage level $V_2$ to voltage level $V_1$ and an edge detector indicates that a falling edge of the FG signal occurs at about time $t_4$. In addition, mask signal $V_M$ transitions from voltage level $V_3$ to voltage level $V_4$ and the output of counter 90 increases in response to counter 90 beginning to count.

In accordance with another embodiment of the present invention, a motor such as, for example, motor 10 is started with a positive torque by gradually increasing the duty of the input PWM signal until the duty of the PWM signal reaches a minimum start duty at which rotor 18 of motor 10 begins to rotate. Rotation of rotor 18 can be referred to as movement of rotor 18 or turning of rotor 18. Then the duty is gradually decreased.

Figure 11:
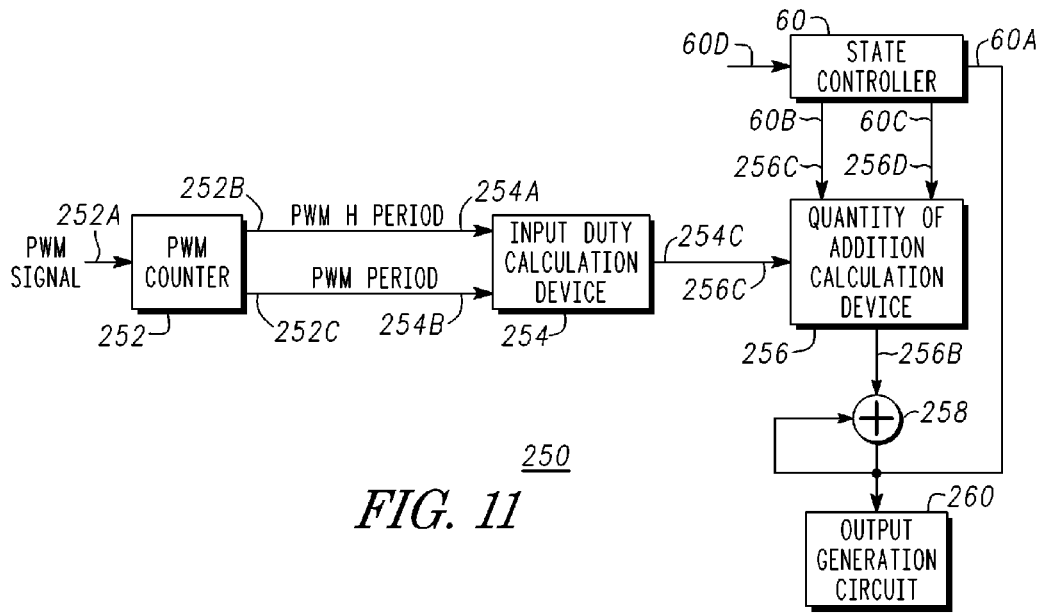
FIG. 11 is a block diagram of a control circuit configured for starting a motor in accordance with another embodiment of the present invention.

FIG. 11 is a block diagram of a control circuit 250 configured for starting motor 10 that rotor 18 rotates in response to gradually increasing the duty of a PWM signal. Control circuit 250 is comprised of a PWM counter 252, an input duty calculation device 254, a calculation device 256, a summer 258, state controller 60, and an output generation circuit 260. More particularly, PWM counter 252 has an input 252A coupled for receiving a PWM signal and outputs 252B and 252C, where output 252B is connected to an input 254A of input duty calculation device 254 and output 252C is connected to an input 254B of input duty calculation device 254. An output 254C of input duty calculation device 254 is connected to an input 256A of calculation device 256. Summer 258 has an input connected to an output 256B and an input connected to its output in a feedback configuration. The output of summer 258 is also connected to an input 60A of state controller 60 and to an input 260A of output generation circuit 260. State controller 60 has outputs 60B and 60C connected to inputs 256C and 256D of calculation device 256, respectively. In addition, state controller 60 has an input 60D coupled for receiving a control signal.

Figure 12:
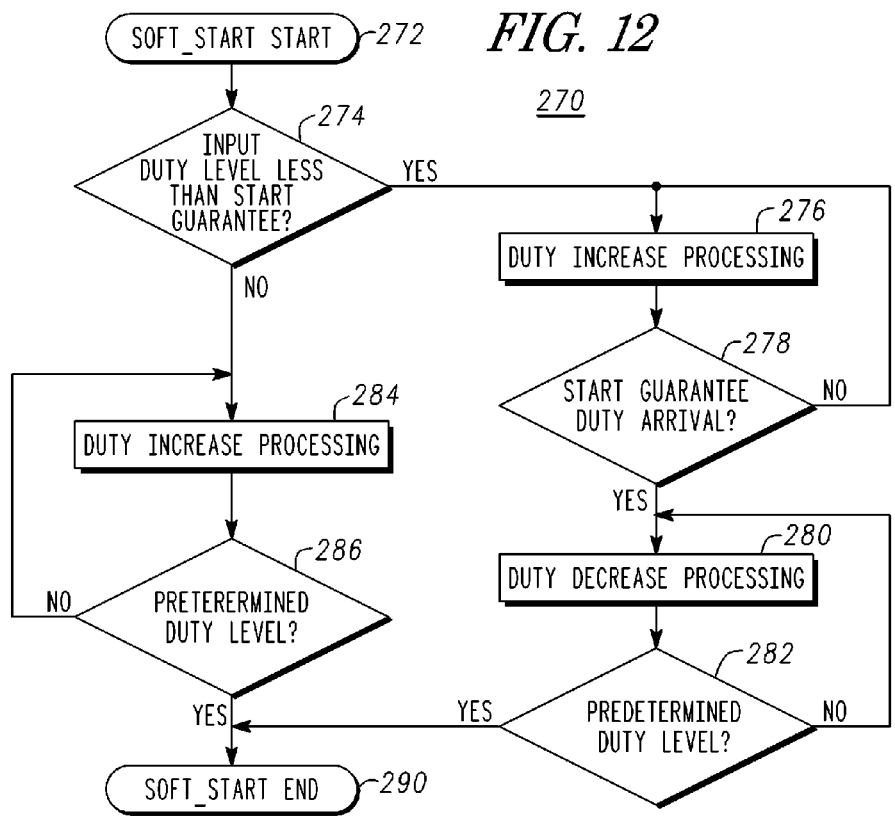
FIG. 12 is a flow diagram for a starting motor in accordance with another embodiment of the present invention.

FIG. 12 is a flow diagram 270 for starting motor 10 in accordance with another embodiment of the present invention. At a beginning step identified by box 272 start processing begins by determining if the input duty of the PWM signal is less than a start guarantee duty of motor 10 as indicated by decision diamond 274. In response to the input duty level being less than the start guarantee value, i.e., the YES branch of decision diamond 274, circuit 250 increases the duty of the FG signal as indicated by box 276. Circuit 250 then determines whether the duty has increased to the start guarantee level at decision diamond 278. In response to the duty not being at the start guarantee level, circuit 250 continues to increase the duty of the FG signal as indicated by the NO branch of decision diamond 278. In response to the duty being at or above the start guarantee level, circuit 250 gradually decreases the duty of the FG signal as indicated by the YES branch of decision diamond 278 and box 280. Circuit 250 monitors the duty of the FG signal to determine if the duty has reached a predetermined level as indicated by decision diamond 282. More particularly, if the predetermined duty level has not been reached, circuit 250 continues decreasing or reducing the duty of the FG signal as indicated by the NO branch of decision diamond 282. If the duty level has reached the predetermined level, the start up process is terminated and the motor continues to run as indicated by the YES branch of decision diamond 282 and box 290.

Referring again to decision diamond 274, if the input duty level is greater than the start guarantee level, i.e., the NO branch of decision diamond 284, circuit 250 increases the duty of the FG signal as indicated by box 284. Circuit 250 monitors the duty of the FG signal to determine if the duty has reached a predetermined level as indicated by decision diamond 286. More particularly, if the predetermined duty level has not been reached, circuit 250 continues increasing the duty of the FG signal as indicated by the NO branch of decision diamond 282. If the duty level has reached the predetermined level, the start up process is terminated and the motor continues to run as indicated by the YES branch of decision diamond 286 and box 290.

Figure 13:
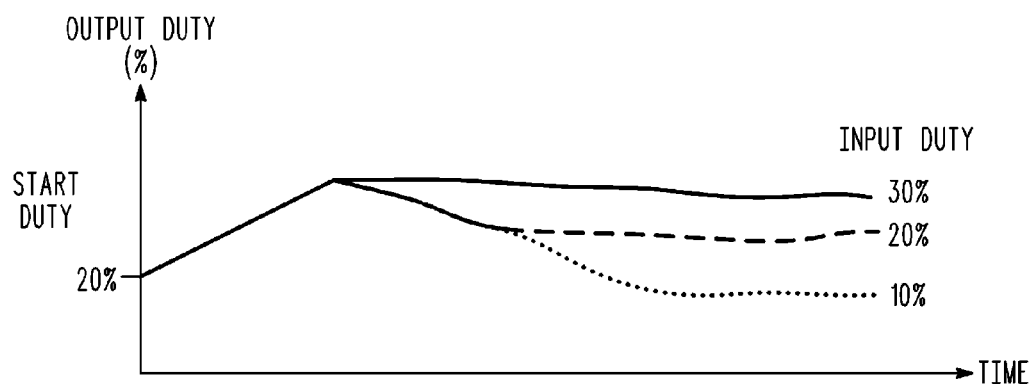
FIG. 13 is a graph of input duty and output duty in accordance with another embodiment of the present invention.

By way of example, FIG. 13 indicates that for the predetermined output duty, i.e., the duty of the FG signal, being 30%, the input duty, i.e., the duty of the input PWM signal, being 10%, and the predetermined duty level of the FG signal being 30%, the duty of the FG signal is increased from 20% until it reaches the predetermined value of 30%, then the duty is gradually reduced until motor 10 starts.

Thus, a signal indicating an increase or decrease between duty value of the input PWM signal and information of guaranteeing start-up value and existing output duty value of the FG signal is sent state controller 60. Once state controller 60 receives the information, state controller 60 determines whether to increase or decrease the duty of the output FG signal, the amount of the increase or decrease, and the timing of increase or decrease. Quantity of addition calculation device 256 controls next output PWM duty width based on the information received from state controller 60.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A method for driving a motor, comprising:
   providing a drive circuit comprising: a rotational state generation circuit having an input/output coupled to an input/output of a state controller; a pulse width modulation detection circuit having an output coupled to an input of the state controller; and a duty control controller having an input coupled to the output of the of pulse width modulation detection circuit;
   determining a position of a first pole of a rotor of the motor relative to a position of a Hall sensor using the rotational state generation circuit;
   moving the rotor of the motor to align the first pole of the rotor with the Hall sensor; and
   generating a drive signal in response to the first pole of the rotor being adjacent to the Hall sensor using the drive circuit.

2. The method of claim 1, further including:
   providing the motor with a stator and the rotor, the stator including a U-phase winding, a W-phase winding, and a V-phase winding;
   coupling the Hall sensor to a portion of the stator that is between the U-phase winding and the W-phase winding; and wherein generating the drive signal includes:
   magnetizing the U-phase winding and the W-phase winding with a first magnetic polarity and the V-phase winding with a second magnetic polarity; and
   wherein the first pole of the rotor is of the first magnetic polarity.

3. The method of claim 2, further including generating a comparison signal in response to comparing a first signal from the Hall sensor with a second signal from the Hall sensor.

4. The method of claim 3, further including generating the drive signal in response to the comparison signal.

5. The method of claim 4, further including masking a first portion of the drive signal.

6. The method of claim 2, further including adjusting the duty of the drive signal.

7. The method of claim 6, wherein adjusting the duty of the drive signal includes:
   increasing the duty of the of the drive signal; and
   decreasing the duty of the drive signal in response to the duty reaching a first reference level.

8. The method of claim 2, wherein generating the drive signal further includes:
   changing the polarity of the W-phase winding from the first magnetic polarity to the second magnetic polarity to rotate the rotor;
   changing the polarity of the V-phase winding from the second magnetic polarity to the first magnetic polarity to further rotate the rotor;
   changing the polarity of the U-phase winding from the second magnetic polarity to the first magnetic polarity to further rotate the rotor; and
   changing the polarity of the W-phase winding from the second magnetic polarity to the first magnetic polarity to rotate the rotor.

9. A method for driving a motor, comprising:
   providing a drive circuit comprising: a rotational state generation circuit having an input/output coupled to an input/output of a state controller; a pulse width modulation detection circuit having an output coupled to an input of the state controller; and a duty control controller having an input coupled to the output of the of pulse width modulation detection circuit, wherein the drive circuit is configured to generate a drive signal;
   providing a motor having a rotor having a first pole of a first magnetic polarity and a second pole of a second magnetic polarity, a stator, a first coil coupled at a first position of the stator and associated with a first drive phase, a second coil coupled at a second position of the stator and associated with a second drive phase, and a third coil coupled at a third position of the stator and associated with a third drive phase of the drive signal, wherein the motor is coupled to the drive circuit;
   coupling a single Hall sensor to the stator, the single Hall sensor coupled to a fourth portion of the stator, the fourth portion between the first coil and the second coil;
   using the single Hall sensor to determine a position of the first pole of the rotor;
   determining a first position of a first pole of a rotor of the motor relative to a position of a Hall sensor;
   pulling the first pole of the rotor to a second position in response to a signal from the single Hall sensor, the second position adjacent the single Hall sensor; and
   starting the motor in response to the first pole of the rotor being pulled to the second position.

10. The method of claim 9, wherein pulling the first pole of the rotor to a first position includes masking an edge of the drive signal.

11. The method of claim 9, wherein starting the motor includes increasing the duty of the drive signal to a predetermined level and decreasing the duty of the drive signal after reaching the predetermined level.

12. The method of claim 9, wherein pulling the first pole of the rotor to a second position in response to a signal from the single Hall sensor further includes moving the rotor so that the first pole of the rotor is adjacent the Hall sensor, wherein the first pole is a south pole.

13. A drive circuit for a motor having a plurality of coils and a single Hall sensor having a first terminal and a second terminal, comprising:
- a rotational state generation circuit having a first input, a second input, and an input/output;
- a state controller having a first input, a second input, a third input, a first input/output, a second input/output, and an output;
- a pulse width modulation detection circuit having an input and an output, the output coupled to the first input of the state controller; and
- a duty control controller having a first input, a first input/output, and an output, the first input of the duty control controller coupled to the output of the pulse width modulation detection circuit and the first input/output coupled to the second/input output of the state controller.

14. The drive circuit of claim 13, further including:
- an output duty generation circuit having a first input, a second input, a first output, a second output, and a third output, the first input of the output duty generation circuit coupled to the output of the duty control controller, the second input of the output duty generation circuit coupled to the output of the state controller; and
- a driver control signal generation circuit having a first input, a second input, a third input, a first output, a second output, and a third output, the first, second, and third inputs of the driver control signal generation circuit coupled to the first, second, and third inputs of the output duty generation circuit, respectively.

15. The driver circuit of claim 14, further including a timer having an output coupled to the second input of the state controller and to the second input of the rotational state generation circuit.

16. The driver circuit of claim 13, further including a masking circuit having an input and an output, the output of the masking circuit coupled to the first input of the rotational state generation circuit and to the third input of the state controller.

17. The driver circuit of claim 16, wherein the masking circuit comprises:
- an edge detector having an input, a first output and a second output;
- a counter having an input and an output, the input coupled to the first output of the edge detector; and
- a judgment circuit having a first input, a second input, and an output, the first input of the judgment circuit coupled to the second output of the edge detector, the second input of the judgment circuit coupled to the output of the counter, and the output of the judgment circuit serving as the output of the masking circuit.

18. The driver circuit of claim 17, wherein the rotational generation circuit comprises:
- a multiplier control circuit having a first input, a second input, and an output, the first input of the multiplier control circuit serving as the input to the rotational state generation circuit and the second input of the multiplier control circuit coupled to the second input of the state controller;
- a multiplier circuit having an input and an input/output, the input of the multiplier circuit coupled to the output of the multiplier control circuit, the input/output of the multiplier circuit coupled to the input/output of the driver control signal generation circuit.

19. The driver circuit of claim 18, wherein the driver control signal generation circuit comprises:
- a calculation device having an input, an input/output, and an output, the input serving as the input of the driver control signal generation circuit, and the input/output serving as the input/output of the driver control signal generation circuit;
- a summer having a first input, a second input, and an output, the first input of the summer coupled to the output of the calculation device; and
- a pulse width modulation output converter having an input and an output, the input of the pulse width modulation output converter coupled to the output of the summer and to the second input of the summer and the output of the pulse width modulation output converter serving as the output of the driver control signal generation circuit.

20. The driver circuit of claim 19, further including a comparator having a first input, a second input, and an output, the first input of the comparator coupled to the first terminal of the Hall sensor, the second input of the comparator coupled to second terminal of the Hall sensor, and the output of the comparator coupled to the input of the masking circuit.

* * * * *